(12) United States Patent
Krafft et al.

(10) Patent No.: US 8,989,083 B2
(45) Date of Patent: Mar. 24, 2015

(54) CONDITIONAL ACCESS SYSTEM FOR SATELLITE OUTDOOR UNIT

(75) Inventors: Stephen Edward Krafft, Santa Cruz, CA (US); Leonard Dauphinee, Irvine, CA (US); Ramon Alejandro Gomez, San Juan Capistrano, CA (US)

(73) Assignee: Broadcom Corporation, Irvine, CA (US)

( * ) Notice: Subject to any disclaimer, the term of this patent is extended or adjusted under 35 U.S.C. 154(b) by 136 days.

(21) Appl. No.: 13/166,353

(22) Filed: Jun. 22, 2011

(65) Prior Publication Data

US 2012/0224527 A1 Sep. 6, 2012

Related U.S. Application Data

(60) Provisional application No. 61/447,969, filed on Mar. 1, 2011.

(51) Int. Cl.
*H04B 7/204* (2006.01)
*H04H 60/14* (2008.01)
*H04H 20/63* (2008.01)
*H04H 40/90* (2008.01)
*H04N 7/20* (2006.01)
(Continued)

(52) U.S. Cl.
CPC .............. *H04H 60/14* (2013.01); *H04H 20/63* (2013.01); *H04H 40/90* (2013.01); *H04N 7/20* (2013.01); *H04H 20/31* (2013.01); *H04H 20/33* (2013.01)
USPC ........... 370/319; 370/316; 370/323; 370/344; 370/481; 370/488; 375/316; 375/319

(58) Field of Classification Search
USPC ......... 370/316, 323, 315, 344, 345, 339, 466, 370/467, 481, 487, 488, 790, 492, 535; 725/120, 116, 114, 100, 103, 95, 85, 725/78, 82, 83, 68, 63; 726/26, 27; 455/3.01, 3.02, 40, 501, 12.1, 215, 455/216, 218
See application file for complete search history.

(56) References Cited

U.S. PATENT DOCUMENTS 6,141,682 A * 10/2000 Barker ........................ 709/217
6,226,491 B1 * 5/2001 Wachs et al. ................ 455/12.1
(Continued)

OTHER PUBLICATIONS

European Search Report for EP Patent Application No. EP12000927.9-1247, European Patent Office, The Hague, Netherlands, mailed on Feb. 4, 2013.

*Primary Examiner* — Ian N Moore
*Assistant Examiner* — Phong La
(74) *Attorney, Agent, or Firm* — Sterne, Kessler, Goldstein & Fox PLLC

(57) ABSTRACT

A method and apparatus is disclosed to restrict the delivery of video, audio, and/or data to unauthorized end users in a satellite communications system. The satellite communications system includes one or more satellite receiving antennas, commonly referred to as a satellite dish, to receive downlink communications signals from one or more satellites. The transmission received by the one or more satellite receiving antennas is converted by an outdoor unit (ODU) for transmission to one or more indoor units (IDUs). The ODU receives control information from one or more satellites from the downlink communications signals, commonly referred to as in-band, and/or from out-of-band communications signals. The ODU may use the control information to restrict access to one or more communications channels embedded within the downlink communications signals to the unauthorized end users.

20 Claims, 4 Drawing Sheets

(51) Int. Cl.
 *H04H 20/31* (2008.01)
 *H04H 20/33* (2008.01)

(56) References Cited

U.S. PATENT DOCUMENTS

| | | | | |
|---|---|---|---|---|
| 7,130,576 | B1* | 10/2006 | Gurantz et al. | 455/3.02 |
| 7,200,868 | B2* | 4/2007 | Mattox et al. | 726/26 |
| 7,706,486 | B2* | 4/2010 | Strodtbeck et al. | 375/349 |
| 7,958,524 | B2* | 6/2011 | Juneau | 725/14 |
| 7,984,463 | B2* | 7/2011 | Deprez et al. | 725/25 |
| 7,987,486 | B2* | 7/2011 | James et al. | 725/63 |
| 8,224,274 | B2* | 7/2012 | Gomez et al. | 455/179.1 |
| 2001/0012277 | A1* | 8/2001 | Campanella | 370/323 |
| 2001/0025374 | A1* | 9/2001 | Han | 725/25 |
| 2001/0043573 | A1* | 11/2001 | Kelly | 370/316 |
| 2003/0137964 | A1* | 7/2003 | Suenaga et al. | 370/342 |
| 2003/0174784 | A1* | 9/2003 | Samarasooriya et al. | 375/308 |
| 2004/0052377 | A1* | 3/2004 | Mattox et al. | 380/277 |
| 2006/0026659 | A1* | 2/2006 | McMullin et al. | 725/111 |
| 2006/0083335 | A1* | 4/2006 | Seendripu et al. | 375/332 |
| 2006/0153161 | A1* | 7/2006 | Nishikawa | 370/352 |
| 2006/0156369 | A1* | 7/2006 | Oishi | 725/131 |
| 2006/0259929 | A1* | 11/2006 | James et al. | 725/71 |
| 2006/0285607 | A1* | 12/2006 | Strodtbeck et al. | 375/298 |
| 2009/0086970 | A1* | 4/2009 | Kahn | 380/211 |
| 2009/0168924 | A1* | 7/2009 | Gomez et al. | 375/340 |
| 2010/0067431 | A1* | 3/2010 | McNeely | 370/316 |
| 2010/0130157 | A1* | 5/2010 | White | 455/323 |
| 2010/0319035 | A1* | 12/2010 | Shah et al. | 725/70 |
| 2012/0155572 | A1* | 6/2012 | Kim et al. | 375/297 |
| 2012/0183110 | A1* | 7/2012 | Kolze et al. | 375/350 |

* cited by examiner

CONDITIONAL ACCESS SYSTEM FOR SATELLITE OUTDOOR UNIT

CROSS-REFERENCE TO RELATED APPLICATIONS

The present application claims the benefit of U.S. Provisional Patent Appl. No. 61/447,969, filed Mar. 1, 2011, which is incorporated herein by reference in its entirety.

BACKGROUND OF INVENTION

1. Field of Invention

The present invention generally relates to an Outdoor Unit (ODU) of a satellite broadcast system. More specifically, the invention relates to a conditional access system for the ODU.

2. Related Art

A satellite broadcaster broadcasts an event, such as a sporting contest, a musical concert, a speech, a movie, a television sitcom, or a television reality show to provide some examples, to one or more end users for viewing using a satellite communications system. The satellite communications system typically includes one or more earth stations to provide video, audio, and/or data depicting the event as well as video, audio, and/or data depicting other events and/or services, such as satellite internet access to provide an example. The earth stations provide the video, audio, and/or data to one or more satellites for transmission to the one or more end users. The one or more end users typically receive transmission from the satellite using one or more satellite receiving antennas, commonly referred to as a satellite dish. The transmission received by the one or more satellite receiving antennas is converted by an outdoor unit (ODU) for transmission to one or more indoor units (IDUs). The one or more indoor units (IDUs) decode the transmission from the ODU for delivery to the one or more end users.

The satellite broadcaster typically employs a conventional conditional access system to restrict the delivery of the video, the audio, and/or the data to unauthorized end users. Conventionally, these conventional conditional access systems are placed within the IDUs. However, if these conventional conditional access systems are compromised by the unauthorized end users, the satellite broadcaster is unable to restrict the delivery of the video, the audio, and/or the data. For example, the unauthorized end users may procure an unauthorized, yet functional, commonly referred to "pirated", IDU to circumvent the conventional conditional access systems. In this situation the satellite broadcaster is unable to restrict the delivery of the video, the audio, and/or the data to the unauthorized end users.

Thus, there is a need for an apparatus and/or a method to restrict the delivery of the video, the audio, and/or the data to the unauthorized end users that overcomes the shortcomings described above. Further aspects and advantages of the present invention will become apparent from the detailed description that follows.

BRIEF DESCRIPTION OF THE DRAWINGS/FIGURES

The accompanying drawings illustrate the present invention and, together with the description, further serve to explain the principles of the invention and to enable one skilled in the pertinent art to make and use the invention.

Figure 1:
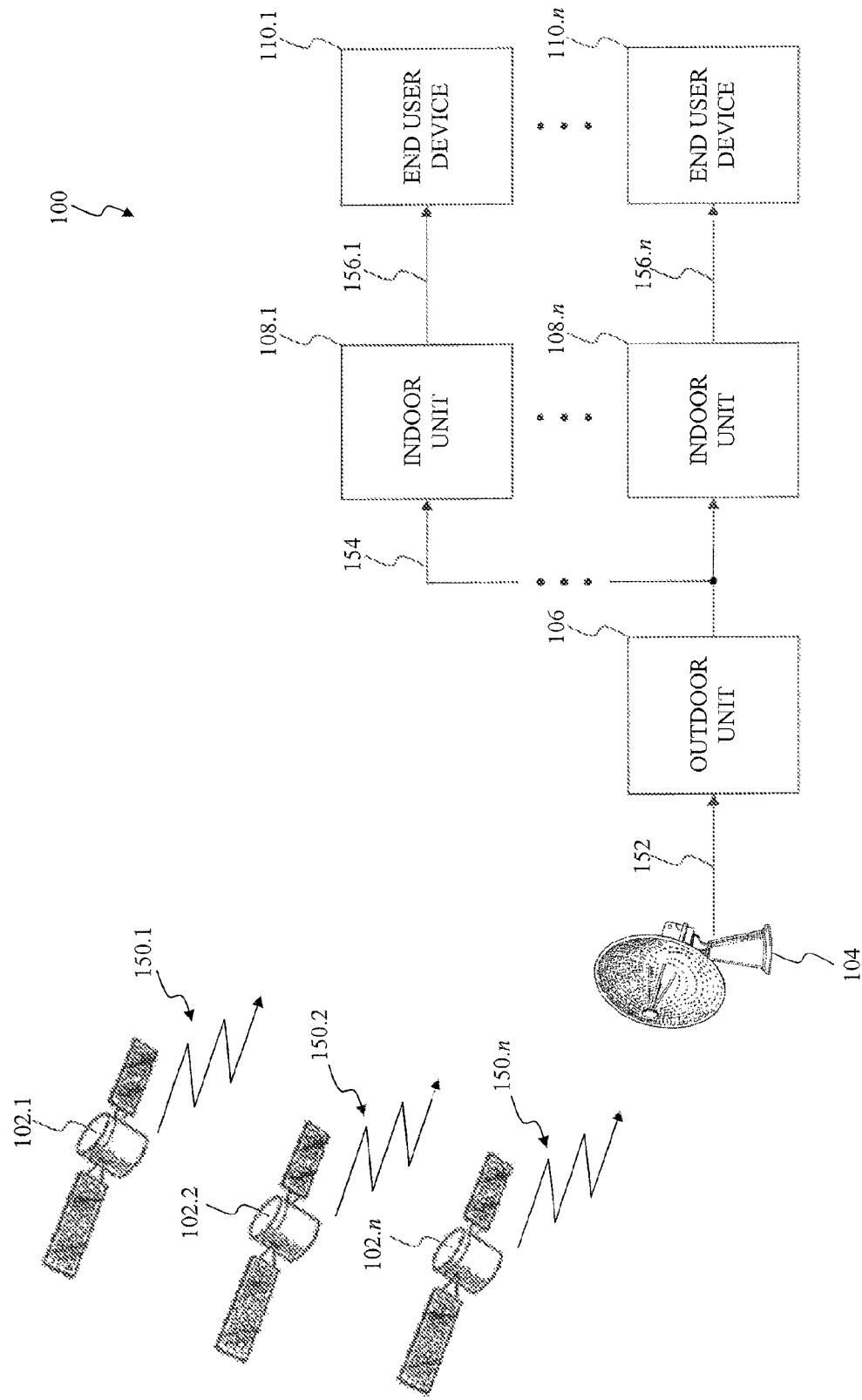
FIG. 1 illustrates a block diagram of a satellite communications environment according to an exemplary embodiment of the present invention.

The present invention will now be described with reference to the accompanying drawings. In the drawings, like reference numbers generally indicate identical, functionally similar, and/or structurally similar elements. The drawing in which an element first appears is indicated by the leftmost digit(s) in the reference number.

DETAILED DESCRIPTION OF THE INVENTION

The following Detailed Description refers to accompanying drawings to illustrate exemplary embodiments consistent with the invention. References in the Detailed. Description to "one exemplary embodiment," "an exemplary embodiment," "an example exemplary embodiment," etc., indicate that the exemplary embodiment described may include a particular feature, structure, or characteristic, but every exemplary embodiment may not necessarily include the particular feature, structure, or characteristic. Moreover, such phrases are not necessarily referring to the same exemplary embodiment. Further, when a particular feature, structure, or characteristic is described in connection with an exemplary embodiment, it is within the knowledge of those skilled in the relevant art(s) to effect such feature, structure, or characteristic in connection with other exemplary embodiments whether or not explicitly described.

The exemplary embodiments described herein are provided for illustrative purposes, and are not limiting. Other exemplary embodiments are possible, and modifications may be made to the exemplary embodiments within the spirit and scope of the invention. Therefore, the Detailed Description is not meant to limit the invention. Rather, the scope of the invention is defined only in accordance with the following claims and their equivalents.

Embodiments of the invention may be implemented in hardware, firmware, software, or any combination thereof. Embodiments of the invention may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact result from computing devices, processors, controllers, or other devices executing the firmware, software, routines, instructions, etc.

The following Detailed Description of the exemplary embodiments will so fully reveal the general nature of the invention that others can, by applying knowledge of those skilled in relevant art(s), readily modify and/or adapt for various applications such exemplary embodiments, without undue experimentation, without departing from the spirit and scope of the present invention. Therefore, such adaptations and modifications are intended to be within the meaning and plurality of equivalents of the exemplary embodiments based upon the teaching and guidance presented herein. It is to be understood that the phraseology or terminology herein is for the purpose of description and not of limitation, such that the terminology or phraseology of the present specification is to be interpreted by those skilled in relevant art(s) in light of the teachings herein.

Satellite Communications Environment According to an Exemplary Embodiment of the Present Invention FIG. 1 illustrates a block diagram of a satellite communications environment according to an exemplary embodiment of the present invention. A satellite communications environment 100 represents a direct broadcast satellite communications environment that directly broadcasts information, such as video, audio, and/or data, from one or more satellites to one or more end user devices. The satellite communication environment 100 includes satellites 102.1 through 102.$n$, a satellite receiving antenna 104, an outdoor unit (ODU) 106, indoor units (IDUs) 108.1 through 108.$n$, and end user devices 110.1 through 110.$n$.

The satellites 102.1 through 102.$n$ provide downlink communications signals 150.1 through 150.$n$ to the satellite receiving antenna 104. The downlink represents a first communications path from the satellites 102.1 through 102.$n$ to the satellite receiving antenna 104. An uplink represents a second communications path from an earth station (not shown in FIG. 1) to the satellites 102.1 through 102.$n$. The downlink communications signals 150.1 through 150.$n$ may include information, such as video, audio, and/or data to provide some examples, that is received from the earth station via the uplink for transmission to the one or more end user devices 110. For example, the video, the audio, and/or the data may include television, internet data, and/or other services to consumers. As another example, the video, the audio, and/or the data may additionally include control information for operation of the ODU 106, the IDUs 108.1 through 108.$n$, and/or the end user devices 110.1 through 110.$n$.

The satellites 102.1 through 102.$n$ provide the downlink communications signals 150.1 through 150.$n$ using an assigned frequency spectrum or band. As an example, satellites 102.1 through 102.$n$ may transmit the downlink communications signals 150.1 through 150.$n$ using the Ku frequency band from approximately 12.5 GHz to approximately 18.0 GHz, the K frequency band from approximately 18.0 GHz to approximately 25.5 GHz, the Ka frequency band from approximately 26.5 GHz to approximately 40.0 GHz or any other suitable frequency band that will be apparent to those skilled in the relevant art(s) without departing from the spirit and scope of the present invention. Typically, the assigned frequency band is divided into n communications channels, whereby each of the satellites 102.1 through 102.$n$ is assigned to transmit its respective downlink communications signal 150.1 through 150.$n$ using one or more of the n communications channels. In an exemplary embodiment, the assigned frequency band is divided into communications channels having a fixed bandwidth of approximately 500 MHz with approximately 100 MHz spacing, commonly referred to as a guard band, between communications channels.

The assigned frequency spectrum, common referred to as in-band, may be used to transfer the control information from the earth station and/or the satellites 102.1 through 102.$n$ to the ODU 106, the IDUs 108.1 through 108.$n$, and/or the end user devices 110.1 through 110.$n$. Alternatively, one or more communications channels outside of the assigned frequency spectrum, commonly referred to as out-of-band, may be used to transfer the control information. The control information may include control signals and/or information relating to the television, the internet data, and/or the other services for the end user devices 110.1 through 110.$n$. The ODU 106 may use the control information to enable and/or disable communication entirely with one or more of the IDUs 108.1 through 108.$n$ or to control access to the television, the internet data, and/or the other services embedded within the one or more of the n communications channels to provide a conditional access system between the satellites 102.1 through 102.$n$ and the IDUs 108.1 through 108.$n$. For example, the may use the control information to enable and/or disable communication entirely with one or more of the IDUs 108.1 through 108.$n$ or to limit or to restrict access to the television, the internet data, and/or the other services embedded within the one or more of the n communications channels to provide the conditional access system.

The satellite receiving antenna 104 observes the downlink communications signals 150.1 through 150.$n$ within the assigned frequency spectrum to provide an observed communications signal 152. The downlink communications signals 150.1 through 150.$n$ may include information, such as video, audio, and/or data that is received from the earth station via the uplink for transmission to the one or more end user devices 110 and/or the control information. The satellite receiving antenna 104 may additionally observe the control information that is characterized as being out-of-band. The satellite receiving antenna 104 may be implemented as a parabolic antenna, commonly referred to as a dish, or as any other well known antenna that is capable of receiving the downlink communications signals 150.1 through 150.$n$ that will be apparent to those skilled in the relevant art(s) without departing from the spirit and scope of the present invention. Although not shown in FIG. 1, the satellite communications environment 100 may use multiple satellite receiving antennas 104 to observe the downlink communications signals 150.1 through 150.$n$.

The ODU 106 provides an intermediary communications signal 154 based upon the observed communications signal 152. The ODU 106 extracts one or more desired communications channels from among the n communications channels embedded within the observed communications signal 152. The ODU 106 frequency translates one or more of the desired communications channels, or portions thereof, to an intermediate frequency band, such as approximately 950 MHz to 2150 MHz to provide an example, to provide the intermediary communications signal 154. Optionally, the ODU 106 may demodulate the one or more of the desired communications channels, or the portions thereof, and remodulate these communications channels in a format different from the downlink communications signals 150.1 through 150.$n$, such as Ethernet to provide an example.

The ODU 106 also receives the control information embedded within the observed communications signal 152 and/or the control information that is characterized as being out-of-band. The ODU 106 may enable and/or disable communication entirely with one or more of the IDUs 108.1 through 108.$n$ in response to the control information. Alternatively, the ODU 106 may disable and/or enable one or more of the multiple signal processing tuners to control access to one or more of the desired communication channels to provide the conditional access system.

The IDUs 108.1 through 108.$n$ decode the intermediary communications signal 154 to provide recovered communications channels 156.1 through 156.$n$. The IDUs 108.1 through 108.$n$ extract the one or more desired communications channels from among the n communications channels embedded within the recovered communications channels 156.1 through 156.$n$. The IDUs 108.1 through 108.$n$ parse and/or deliver the information, such as the video, the audio, and/or the data to provide some examples, that is received from the one or more desired communications channels embedded within the intermediary communications signal 154.

The end user devices 110.1 through 110.$n$ may include televisions, monitors, personal computers, data terminal equipment, telephony devices, mobile communication devices, broadband media players, personal digital assistants, software applications, or any other device that is capable of utilizing the video, the audio, and/or the data embedded within the recovered communications channels 156.1 through 156.

Figure 2:
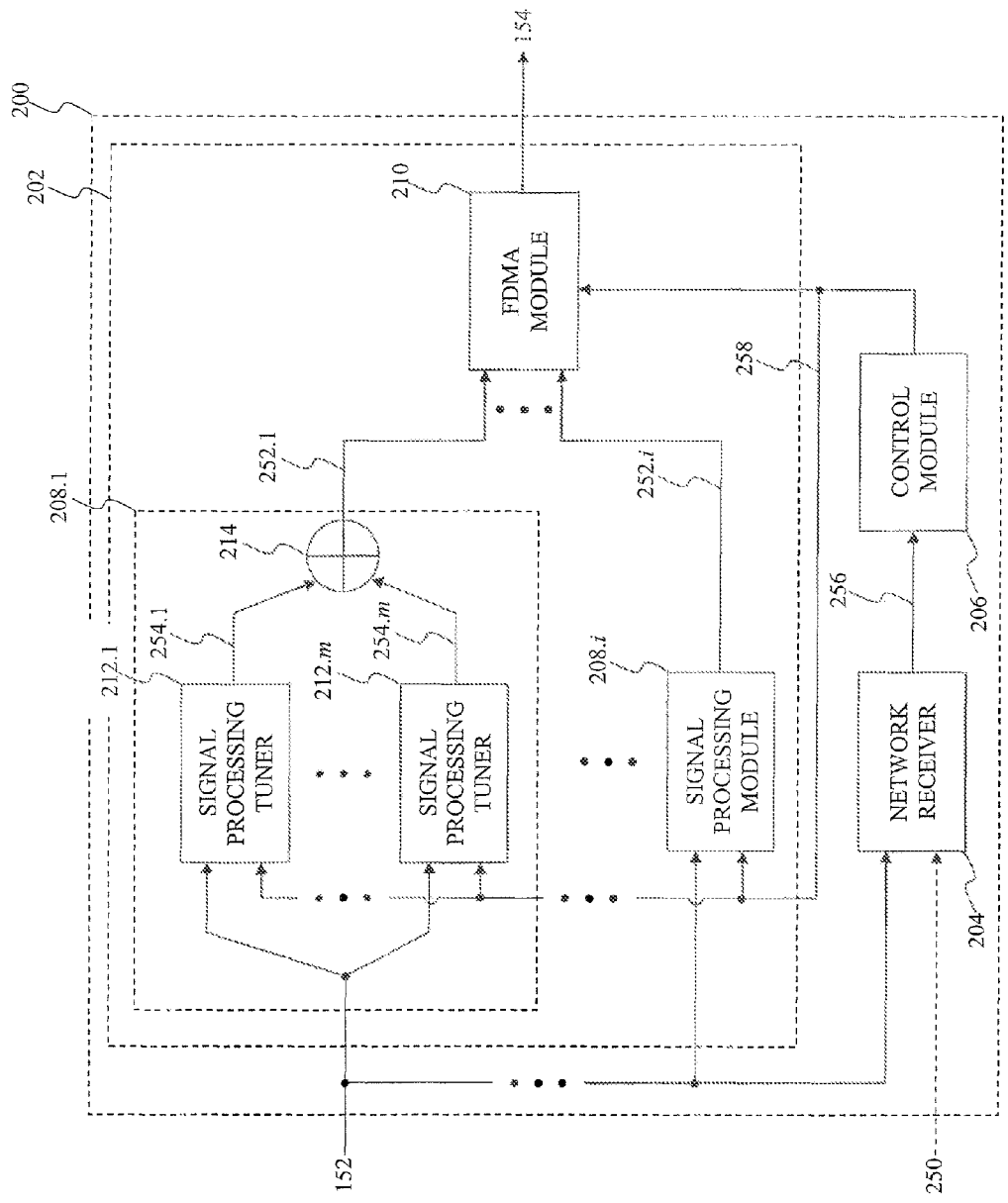
FIG. 2 illustrates a block diagram of an outdoor unit (ODU) implemented as part of the satellite communications environment according to an exemplary embodiment of the present invention.

A First Outdoor Unit (ODU) According to an Exemplary Embodiment of the Present Invention FIG. 2 illustrates a block diagram of an outdoor unit (ODU) implemented as part of the satellite communications environment according to an exemplary embodiment of the present invention. An ODU 200 selects one or more of desired communications channels, or portions thereof, from among the n communications channels embedded within the observed communications signal 152. The ODU 200 may receive control information for operation of the IDUs 108.1 through 108.$n$ and/or the end user devices 110.1 through 110.$n$. The ODU 200 may use the control information to enable and/or disable communication entirely with one or more of the IDUs 108.1 through 108.$n$ or to control access to the television, the internet data, and/or the other services embedded within the one or more of the n communications channels to provide a conditional access system between the satellites 102.1 through 102.$n$ and the IDUs 108.1 through 108.$n$. The ODU 200 includes a frequency translation module 202, a network receiver 204, and a control module 206. The ODU 200 may represent an exemplary embodiment of the ODU 106.

The frequency translation module 202 includes signal processing modules 208.1 through 208.$i$ and a frequency division multiple access (FDMA) module 210. The signal processing modules 208.1 through 208.$i$ determine one or more desired communications channels from among the n communications channels embedded within the observed communications signal 152 to provide intermediate frequency bands 252.1 through 252.$i$. The signal processing modules 208.1 through 208.$i$ include signal processing tuners 212.1 through 212.$m$ and a combination module 214. Each of the signal processing modules 208.1 through 208.$i$ are implemented in a substantially similar manner; however, the signal processing modules 208.1 through 208.$i$ may include a different number of the signal processing tuners 212.1 through 212.$m$.

The signal processing tuners 212.1 through 212.$m$ filter one or more unwanted communications channels from among the n communications channels embedded within the observed communications signal 152 leaving the one or more desired communications channels from among the n communications channels. The one or more desired communications channels for signal processing tuners 212.1 through 212.$m$ may be similar desired communications channels or dissimilar desired communications channels. The signal processing tuners 212.1 through 212.$m$ frequency translate the one or more desired communications channels to an intermediate frequency to provide translated communications channels 254.1 through 254.$m$. The combination module 214 combines the translated communications channels 254.1 through 254.$m$ to provide the intermediate frequency band 252.1.

In an exemplary embodiment, the signal processing modules 208.1 through 208.$i$ include three signal processing tuners 212.1 through 212.3. In this exemplary embodiment, each of the signal processing tuners 212.1 through 212.3 frequency translate a single desired communications channel from among the n communications channels embedded within the observed communications signal 152 which are then combined to form a triple stacked communication signal. In another exemplary embodiment, the ODU 200 includes five signal processing modules 208.1 through 208.5, each of the signal processing modules 208.1 through 208.5 providing the triple stacked communication signal for a total of fifteen desired communications channels from among the n communications channels as the intermediate frequency bands 252.1 through 252.$i$.

The FDMA module 210 translates one or more of the desired communications channels, or portions thereof, from the among the intermediate frequency bands 252.1 through 252.$i$ to a particular frequency band that may be decoded by one or more of the IDUs 108.1 through 108.$n$.

The frequency translation module 202 is further described in U.S. patent application Ser. No. 12/337,046, filed on Dec. 17, 2008, which is incorporated by reference herein in its entirety.

The network receiver 204 extracts the control information that is embedded within the observed communications signal 152 and/or from an out-of-band communications channel 250. The network receiver 204 frequency translates the control information to baseband or any suitable intermediate frequency, demodulates the control information, and/or decodes the control information to provide received control information 256.

The control module 206 provides control signals 258 based upon the received control information 256. The control module 206 may use the control information to enable and/or disable communication entirely with one or more of the IDUs 108.1 through 108.$n$ or to control access to the television, the internet data, and/or the other services embedded within the one or more of the n communications channels embedded within the observed communications signal 152 to provide a conditional access system between the satellites 102.1 through 102.$n$ and the IDUs 108.1 through 108.$n$. The control signals 258 may be used to enable and/or disable the signal processing modules 208.1 through 208.$i$, along with their respective signal processing tuners 212.1 through 212.$m$, and/or the FDMA module 210. For example, the control signals 258 may disable one or more of the signal processing tuners 212.1 through 212.$m$ from the signal processing module 208.1 such that their respective translated communications channels 254.1 through 254.$m$ are no longer provided to the combination module 214. As another example, the control signals 258 may disable the signal processing module 208.1, in its entirety, such that the intermediate frequency band 252.1 is no longer provided to the FDMA module 210. As a further example, the control signals 258 may disable the FDMA module 210 such that the intermediary communications signal 154 is no longer provided to the IDUs 108.1 through 108.$n$. As a yet further example, the control signals 258 may disable a portion of the FDMA module 210 such that one or more of the frequency bands 252.1 through 252.*i* are no longer provided to the IDUs 108.1 through 108.*n* as part of the intermediary communications signal 154.

In an exemplary embodiment, the control module 206 possesses a unique address that allows an earth station within a satellite communications environment to select the ODU 200 from among multiple other ODUs within the satellite communications environment. The earth station may independently control the ODU 200 in this environment to control access to unauthorized, yet functional, IDUs and/or end user devices within the satellite communications environment to provide additional security to the satellite communications environment.

In another exemplary embodiment, the frequency translation module 202 and/or the control module 206 may be controlled using firmware that is stored within each of these modules and/or the frequency translation module 202. The ODU 202 may update this firmware via the control information that is embedded within the observed communications signal 152 and/or the out-of-band communications channel 250.

Figure 3:
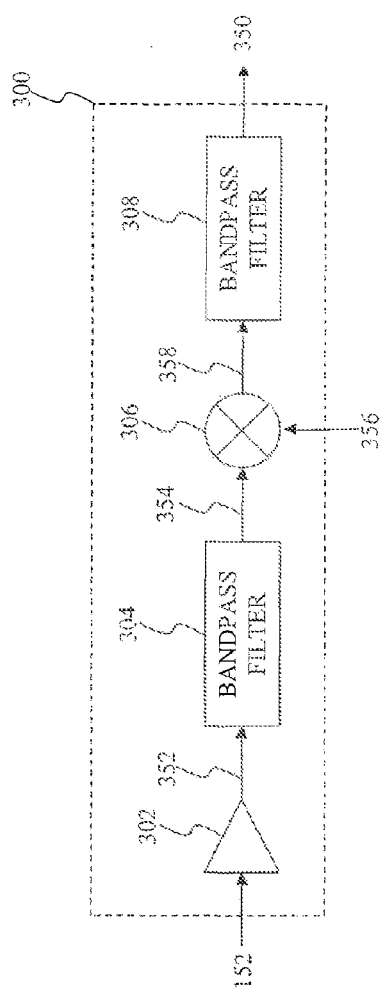
FIG. 3 illustrates a block diagram of a signal processing tuner implemented as part of the first ODU according to an exemplary embodiment of the present invention.

Signal Processing Tuner Implemented as Part of the First ODU According to an Exemplary Embodiment of the Present Invention FIG. 3 illustrates a block diagram of a signal processing tuner implemented as part of the first ODU according to an exemplary embodiment of the present invention. A signal processing tuner 300 filters one or more unwanted communications channels from among the n communications channels embedded within the observed communications signal 152 leaving one or more desired communications channels from among the n communications channels. The signal processing tuner 300 frequency translates the one or more desired communications channels to an intermediate frequency to provide a translated communications channels 350. The signal processing tuner 300 includes an amplifier module 302, a first bandpass filter module 304, a mixing module 306, and a second bandpass filter module 308. The signal processing tuner 300 may represent an exemplary embodiment of one or more of the signal processing tuners 212.1 through 212.*m*.

The amplifier module 302 amplifies the n communications channels embedded within the observed communications signal 152 to provide qn amplified communications signal 352.

The first bandpass filter module 304 filters the amplified communications signal 352 to provide a filtered communications signal 354. The first bandpass filter module 304 filters unwanted noise embedded within the amplified communications signal 352 and/or one or more unwanted communications channels from among the n communications channels embedded within the observed communications signal 152 to provide the filtered communications signal 354.

The mixer module 306 frequency translates the filtered communications signal 354 using a local oscillator signal 552 to provide a translated communications signal 358. The mixer module 306 may frequency translate the filtered communications signal 354 to approximately baseband or a suitable intermediate frequency (IF) that will be apparent to those skilled in the relevant art(s) from the teachings herein without departing from the spirit and scope of the present invention.

The second bandpass filter module 308 filters the translated communications signal 358 to provide the translated communications channels 350. The translated communications channels 350 may represent an exemplary embodiment of one or more of the intermediate frequency bands 252.1 through 252.*i*. The second bandpass filter module 308 filters unwanted noise embedded within the translated communications signal 358 and/or one or more unwanted communications channels from among the communications channels embedded within the translated communications signal 358 leaving one or more desired communications channels from among the n communications channels embedded within the observed communications signal 152.

Figure 4:
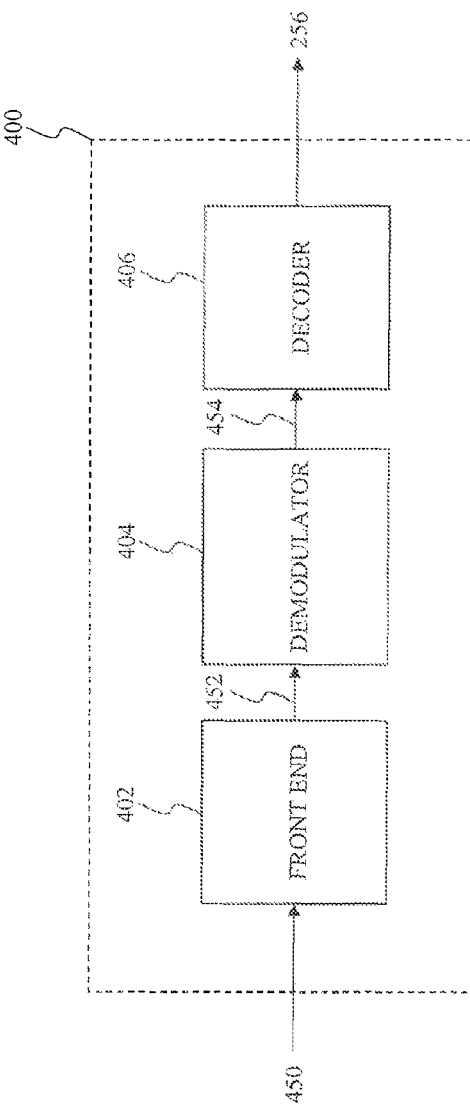
FIG. 4 illustrates a block diagram of a network receiver implemented as part of the first ODU according to an exemplary embodiment of the present invention.

Network Receiver Implemented as Part of the First ODU According to an Exemplary Embodiment of the Present Invention FIG. 4 illustrates a block diagram of a network receiver implemented as part of the first ODU according to an exemplary embodiment of the present invention. A network receiver 400 receives the control information that is embedded within the observed communications signal 152 and/or from an out-of-band communications channel 250. The network receiver 400 frequency translates the control information to baseband or any suitable intermediate frequency, demodulates the control information, and/or decodes the control information to provide the received control information 256. The network receiver 400 includes a front end module 402, a demodulator module 404, and a decoder module 406. The network receiver 400 may represent an exemplary embodiment of the network receiver 402.

The front end module 402 provides modulated control information 452 based upon received control information 450. The received control information 450 may be embedded within the observed communications signal 152 and/or from the out-of-band communications channel 250.

The front end module 402 may amplify the received control information 450, convert the received control information 450 from an analog representation to a digital representation, frequency translate the received control information 450 to approximately baseband or a suitable intermediate frequency (IF) that will be apparent to those skilled in the relevant art(s) without departing from the spirit and scope of the present invention, or perform any combination of these functions without departing from the spirit and scope of the present invention.

The demodulator module 404 demodulates the modulated control information 452 using any suitable analog or digital demodulation technique for any suitable modulation technique such as amplitude modulation (AM), frequency modulation (FM), phase modulation (PM), phase shift keying (PSK), frequency shift keying (FSK), amplitude shift keying (ASK), quadrature amplitude modulation (QAM) and/or any other suitable demodulation technique that will be apparent to those skilled in the relevant art(s) without departing from the spirit and scope of the present invention to provide encoded control information 454.

The decoder module 406 decodes the encoded control information 454 using any suitable decoding scheme that will be apparent to those skilled in the relevant art(s) without departing from the spirit and scope of the present invention to provide the received control information 256. For example, the decoder module 406 may additional apply error correction decoding, such as block code decoding and/or convolution code decoding to provide some examples, to the encoded control information 454.

Figure 5:
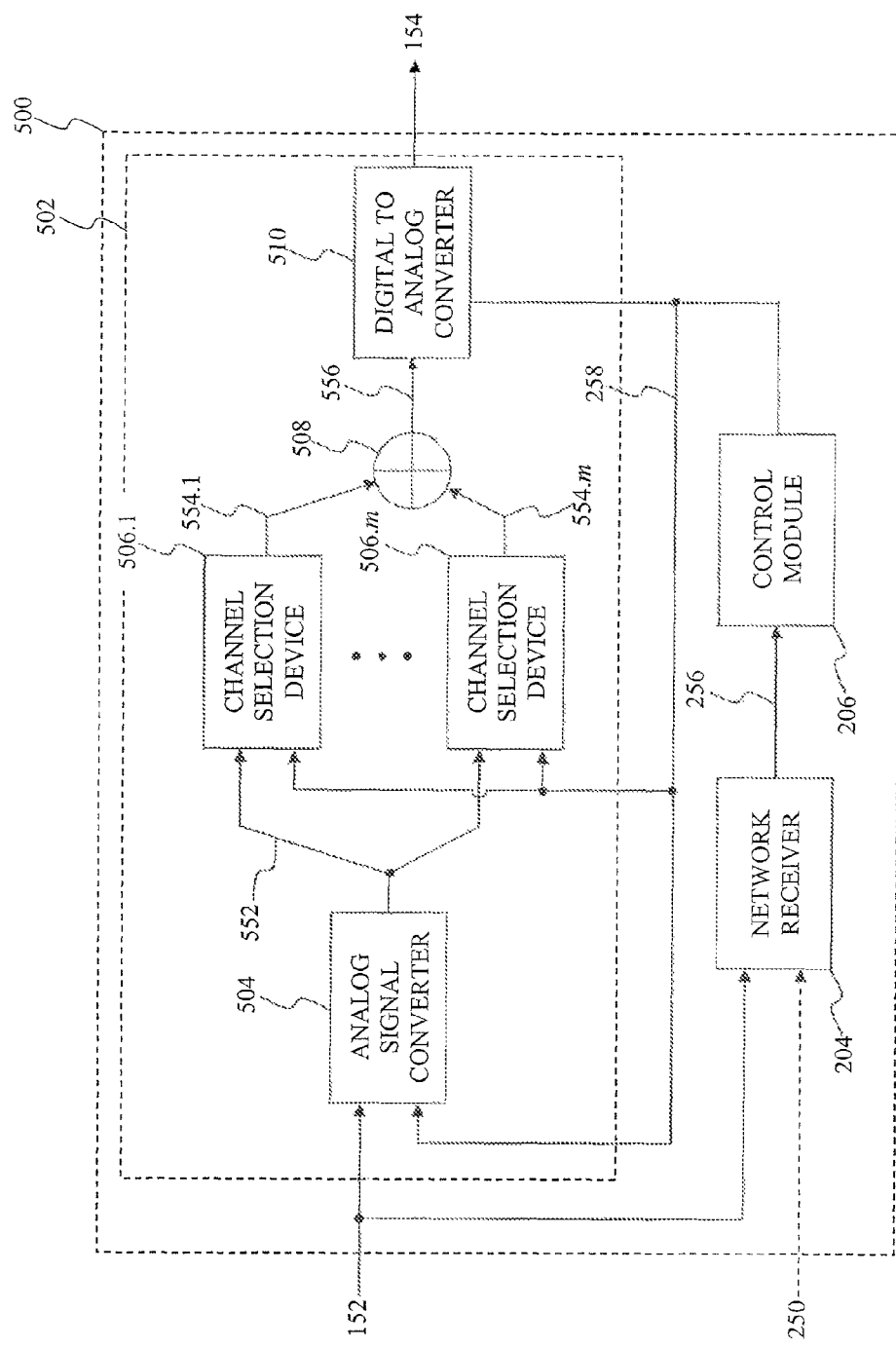
FIG. 5 illustrates a block diagram of an outdoor unit (ODU) implemented as part of the satellite communications environment according to an exemplary embodiment of the present invention.

A Second Outdoor Unit (ODU) According to an Exemplary Embodiment of the Present Invention FIG. 5 illustrates a block diagram of an outdoor unit (ODU) implemented as part of the satellite communications environment according to an exemplary embodiment of the present invention. An ODU 500 selects one or more of desired communications channels, or portions thereof, from among the n communications channels embedded within the observed communications signal 152. The ODU 500 may receive control information for operation of the IDUs 108.1 through 108.n and/or the end user devices 110.1 through 110.n. The ODU 500 may use the control information to enable and/or disable communication entirely with one or more of the IDUs 108.1 through 108.n or to control access to the television, the internet data, and/or the other services embedded within the one or more of the n communications channels to provide a conditional access system between the satellites 102.1 through 102.n and the IDUs 108.1 through 108.n. The ODU 500 includes the network receiver 204, the control module 206, and a frequency translation module 502. The ODU 500 may represent an exemplary embodiment of the ODU 106.

The frequency translation module 502 includes an analog signal converter 504, channel selection devices 506.1 through 506.m, a summation module 508, and a digital to analog converter (DAC) 510. The analog signal converter 504 converts the observed communications signal 152 from an analog representation to a digital representation to provide a digital communications signal 552. The analog signal converter 504 may convert the n communications channels embedded within the observed communications signal 152 from the analog representation to the digital representation. Alternatively, the analog signal converter 504 may convert some of the n communications channels embedded within the observed communications signal 152 from the analog representation to the digital representation. The analog signal converter 504 may, optionally, filter the unwanted noise embedded within the observed communications signal 152 and/or one or more unwanted communications channels from among the n communications channels embedded within the observed communications signal 152.

The channel selection devices 506.1 through 506.m process the digital communications signal 552 to provide desired communications channels 554.1 through 554.m. The channel selection devices 506.1 through 506.m filter one or more unwanted communications channels from among the n communications channels embedded within the digital communications signal 552 leaving one or more desired communications channels from among the n communications channels. The channel selection devices 506.1 through 506.m frequency translate the one or more desired communications channels to an intermediate frequency to provide the desired communications channels 554.1 through 554.m. The combination module 508 combines the desired communications channels 554.1 through 554.m to provide an intermediate frequency band 556.

The DAC 510 converts the intermediate frequency band 556 from a digital representation to an analog representation to provide the intermediary communications signal 154.

The frequency translation module 502 is further described in U.S. patent application Ser. No. 12/337,046, filed on Dec. 17, 2008, which is incorporated by reference herein in its entirety.

The network receiver 204 extracts the control information that is embedded within the observed communications signal 152 and/or from an out-of-band communications channel 250 to provide the received control information 256. Although not shown in FIG. 5, the control information may be alternatively extracted from the digital communications signal 552 and/or from the out-of-band communications channel 250 to provide the received control information 256.

The control module 206 provides the control signals 258 based upon the received control information 256. The control module 206 may use the control information to enable and/or disable communication entirely with one or more of the IDUs 108.1 through 108.n or to control access to the television, the internet data, and/or the other services embedded within the one or more of the n communications channels embedded within the observed communications signal 152 to provide a conditional access system between the satellites 102.1 through 102.n and the IDUs 108.1 through 108.n. The control signals 258 may be used to enable and/or disable the analog signal converter 504, the channel selection devices 506.1 through 506.m, and/or the DAC 510. For example, the control signals 258 may disable the analog signal converter 504 such that the digital communications signal 552 is no longer provided to the channel selection devices 506.1 through 506.m. As another example, the control signals 258 may disable one or more of the channel selection devices 506.1 through 506.m such that their respective the desired communications channel 554.1 through 554.m is no longer provided to the combination module 508. As a further example, the control signals 258 may disable the DAC 510 such that the intermediary communications signal 154 is no longer provided to the IDUs 108.1 through 108.n.

CONCLUSION

While various embodiments of the present invention have been described above, it should be understood that they have been presented by way of example, and not limitation. It will be apparent to persons skilled in the relevant art(s) that various changes in form and detail may be made therein without departing from the spirit and scope of the invention. Thus the present invention should not be limited by any of the above-described exemplary embodiments, but should be defined only in accordance with the following claims and their equivalents.

What is claimed is:

1. An outdoor unit (ODU) in a satellite communication system configured to provide a digital communication signal, the ODU comprising:
    a network receiver, comprising:
        a front end module configured to:
            receive a communication signal, and
            convert the communication signal from an analog representation to a digital representation to provide modulated control information,
        a demodulator module configured to demodulate the modulated control information to provide encoded control information, and
        a decoder module configured to decode the encoded control information to provide control information;
    a frequency translation module, comprising:
        an analog signal converter configured to convert the communication signal from an analog signal to a digital signal,
        a plurality of channel selection devices configured to receive the digital signal and a control signal and to provide a plurality of communication channels, and
        a digital to analog converter (DAC) configured to receive the plurality of communication channels and to provide the digital communication signal; and
    a control module configured to:
        send the control signal, corresponding to the control information, to a first channel selection device in the plurality of channel selection devices, wherein the control signal is configured to disable the first channel selection device.

2. A satellite communication system configured to provide a digital communication signal, the satellite communication system comprising:
    an indoor data unit (IDU); and
    an outdoor unit (ODU) configured to:

receive a communication signal,
convert the communication signal from an analog representation to a digital representation to provide modulated control information,
demodulate the modulated control information to provide encoded control information,
decode the encoded control information to provide a control information,
convert the communication signal from an analog signal to a digital signal,
provide, based on the digital signal and a control signal, a plurality of communication channels using a plurality of channel selection devices,
provide, based on the plurality of communication channels, the digital communication signal, and
send, based on the control information, the control signal to a first channel selection device in the plurality of channel selection devices, wherein the control signal is configured to disable the first channel selection device.

3. The satellite communication system of claim 2, wherein the ODU comprises:
a frequency translation module configured to select a communication channel from among a plurality of communication channels in the communication signal.

4. The satellite communication system of claim 3, wherein the frequency translation module comprises:
a frequency division multiple access (FDMA) module configured to select the communication channel.

5. The satellite communication system of claim 3, wherein the frequency translation module comprises:
an analog signal converter configured to convert the communication signal from the analog signal to the digital signal; and
a digital to analog converter (DAC) configured to provide the digital communication signal.

6. The satellite communication system of claim 3, wherein the ODU further comprises:
a network receiver configured to extract the modulated control information from the communication signal.

7. The satellite communication system of claim 6, wherein the network receiver comprises:
a front end module configured to extract the modulated control information from the communication signal;
a demodulator module configured to demodulate the modulated control information to provide the encoded control information; and
a decoder module configured to decode the encoded control information to provide the control information.

8. The satellite communication system of claim 3, wherein the control module is further configured to:
disable the frequency translation module based on the control information.

9. An outdoor unit (ODU), comprising:
a network receiver, comprising:
a front end module configured to:
receive a communication signal comprising a plurality of communication channels, and
convert the communication signal from an analog representation to a digital representation to provide, based on the communication signal, modulated control information,
a demodulator module configured to demodulate the modulated control information to provide encoded control information, and
a decoder module configured to decode the encoded control information to provide control information;
a frequency translation module comprising a plurality of hardware components, the hardware components comprising:
an analog signal converter configured to convert the communication signal from an analog representation to a digital representation,
a plurality of channel selection devices configured to remove a subset of a plurality of communication channels in the communication signal, and
a digital to analog converter (DAC); and
a control module configured to:
receive the control information,
send, based on the control information, a control signal to a hardware component of the plurality of hardware components that corresponds to the control information, wherein the control signal is configured to disable the hardware component.

10. The ODU of claim 9, wherein the frequency translation module is further configured to generate an intermediary communication signal.

11. The ODU of claim 10, further comprising:
a frequency division multiple access (FDMA) module, wherein the control module is further configured to disable, based on the control information, a portion of the FDMA module such that the intermediary communication signal is no longer provided to an indoor data unit (IDU).

12. The ODU of claim 10, further comprising:
a frequency division multiple access (FDMA) module, wherein the control module is further configured to disable, based on the control information, a portion of the FDMA module such that one or more frequency bands are no longer provided to an indoor data unit (IDU) as part of the intermediary communication signal.

13. The ODU of claim 9, wherein the control module is further configured to:
control access, based on the control information, to a first service embedded within the communication channels.

14. The ODU of claim 13, wherein the first service is internet data, and wherein a second service embedded within the communication channels is television data.

15. The ODU of claim 9, wherein the control module is further configured to send the control signal to the analog signal converter, and wherein the control signal is configured to disable the analog signal converter.

16. The ODU of claim 9, wherein the control module is further configured to send the control signal to a first channel selection device of the plurality of channel selection devices, and wherein the control signal is configured to disable the first channel selection device.

17. The ODU of claim 9, wherein the control module is further configured to send the control signal to the DAC, and wherein the control signal is configured to disable the DAC.

18. The ODU of claim 1, wherein the control signal is further configured to disable a second channel selection device in the plurality of channel selection devices.

19. The ODU of claim 1, wherein the control signal is further configured to disable the analog signal converter.

20. The ODU of claim 1, wherein the control signal is further configured to disable the DAC.

* * * * *